United States Patent [19]

Edgar et al.

[11] Patent Number: 5,597,912
[45] Date of Patent: Jan. 28, 1997

[54] PROCESS FOR PREPARING CELLULOSE ESTERS BY USE OF CARBOXYLIC ACIDS

[75] Inventors: Kevin J. Edgar, Kingsport; Charles M. Buchanan, Bluff City, both of Tenn.

[73] Assignee: Eastman Chemical Company, Kingsport, Tenn.

[21] Appl. No.: 206,236

[22] Filed: Mar. 4, 1994

Related U.S. Application Data

[63] Continuation of Ser. No. 509,385, Apr. 16, 1990, abandoned.

[51] Int. Cl.$^6$ .................................................. C08B 3/24
[52] U.S. Cl. ........................... 536/63; 536/65; 536/68; 536/76; 536/80
[58] Field of Search .......................... 536/58, 63, 64, 536/65, 124, 68, 76, 80

[56] References Cited

U.S. PATENT DOCUMENTS

| | | | |
|---|---|---|---|
| 1,880,560 | 10/1932 | Webber et al. | 536/67 |
| 1,984,147 | 12/1934 | Malm | 536/82 |
| 2,005,383 | 6/1935 | Murray et al. | 536/82 |
| 2,026,583 | 1/1936 | Malm et al. | 536/65 |
| 2,129,052 | 9/1938 | Fordyce | 536/76 |
| 2,327,770 | 8/1943 | Crane | 536/76 |
| 2,448,082 | 8/1948 | Creamer | 536/76 |
| 2,470,191 | 5/1949 | Seymour et al. | 536/81 |
| 2,801,239 | 7/1957 | Hiatt et al. | 536/68 |
| 2,836,590 | 5/1958 | Turner | 536/76 |
| 3,482,011 | 12/1969 | Bohrer | 264/207 |
| 4,480,090 | 10/1984 | Kuo et al. | 536/58 |
| 4,543,409 | 9/1985 | Diamantoglou et al. | 536/68 |

FOREIGN PATENT DOCUMENTS

| | | |
|---|---|---|
| 1143485 | 10/1957 | France . |
| 329704 | 5/1930 | United Kingdom . |
| 317088 | 8/1930 | United Kingdom . |
| 356012 | 9/1931 | United Kingdom . |
| 398626 | 9/1933 | United Kingdom . |
| 488946 | 7/1938 | United Kingdom . |
| 496065 | 11/1938 | United Kingdom . |
| 568932 | 4/1945 | United Kingdom . |
| 581157 | 9/1946 | United Kingdom . |
| 696903 | 8/1951 | United Kingdom . |
| 755018 | 8/1956 | United Kingdom . |
| 2105725 | 3/1983 | United Kingdom . |

OTHER PUBLICATIONS

*Chemical Abstracts*, 69:44669d (SU 213,794), vol. 69, No. 11, Sep. 9, 1968.
*Chemical Patents Index*, Week 8914, AN 89–105159/14, May 31, 1989, Derwent Publications (SU 1,419,988).
T. Miyamoto et al., *J. Poly. Sci., Poly. Chem. Ed.*, 23, pp. 1373–1381 (1985).
K. Kamide et al., *Polym. J.*, 19, pp. 1405–1412 (1987).
V. W. Goodlett et al., *J. Polym. Sci.: Part A–1*, 9, pp. 155–161 (1971).
C. M. Buchanan et al., *Macromolecules*, 20, pp. 2750–2754 (1987).
C. M. Buchanan et al., *Carbohydrate Research*, 177, 228–234 (1988).
T. Miyamoto et al., *J. Polym. Sci.: Polym. Chem. Ed.*, 22, pp. 2363–2370 (1984).
C. J. Malm et al., *Industrial Eng. Chemistry*, 49(1), pp. 79–83 (1957).
G. A. Petropavlovskii et al., *Zhurnal Prikladnoi Khimii*, 39(1), pp. 237–240 (1966) (English translation).
*Chemical Abstracts*, 89:112892m (G. Rakhmanberdiev et al., *Cellul. Chem. Technol.*, 12(2), pp. 153–176 (1978)).
G. Rakhmanberdiev et al., *Zhurnal Prikladnoi Khimi*, 46(2), pp. 416–419 (1973) (English translation).
A. Rheiner, *Tiba 11*, pp. 567–577, 643–651, 723–729 (1933).
*Chemical Abstracts*, 85:48041w (B. Isazhanov et al., Mater. Resp. Knf. Tekst. Khim., 3, 82 (1974)).
L. A. Hiller, Jr., *J. Polymer Sci.*, 10, pp. 385–423 (1953).
E. Knoevenagel et al., *Cellulosechemie*, 3, pp. 113–124 (1922).
R. N. Haward et al., *J. Soc. Chem. Ind.*, 65, pp. 63–64 (1948).
*Chemical Abstracts*, 26:3377 (Canadian Patent 321,228 issued Apr. 5, 1932, to C. J. Malm).
*Chemical Abstracts*, 24:6014 (French Patent 686,019 issued Mar. 4, 1929, to M. Klein).
Walker, "State of Dissolved Formaldehyde", in *Formaldehyde*, ACS Monograph series, 1964 month unavailable.

*Primary Examiner*—Jeffrey C. Mullis
*Attorney, Agent, or Firm*—Betty J. Boshears; William P. Heath

[57] ABSTRACT

Process for reducing the degree of substitution of cellulose esters employing carboxylic acids as solvolysis promoters is disclosed. Exemplary cellulose esters are cellulose acetate, cellulose propionate, cellulose butyrate, cellulose acetate propionate, and cellulose acetate butyrate.

15 Claims, 2 Drawing Sheets

PROCESS FOR PREPARING CELLULOSE ESTERS BY USE OF CARBOXYLIC ACIDS

This is a continuation of application Ser. No. 07/509,385 filed on Apr. 16, 1990, now abandoned.

FIELD OF INVENTION

This invention relates to the preparation of cellulose esters of low degree of substitution. In one aspect, it relates to the preparation of cellulose acetates of low degree of substitution (cellulose monoacetates or CMA's) by solvolysis of cellulose esters using a carboxylic acid. In another aspect, it relates to the preparation of cellulose esters which have high affinity for water, as expressed by water solubility or absorption.

BACKGROUND OF THE INVENTION

Cellulose esters having a degree of substitution less than 3 (i.e., less than fully substituted) find wide application in commerce. These materials serve many markets such as molding plastics, clear sheets, filter tow, and as coatings polymers, to name a few forms and applications. Methods for their economical and selective preparation are clearly desirable.

Polymers which have affinity for water are of great commercial interest. Water-absorbent polymers, such as poly(acrylates), are used commercially in diapers, absorbent pads, and similar high-volume consumer goods. Water-soluble polymers also find widespread use in the marketplace. They are used in foods, oilfield applications, cosmetics, and pharmaceuticals, to cite a few examples. It is clear, therefore, that new and superior processes for the manufacture of polymers with high water affinity may be of considerable benefit.

It is well known in the art that cellulose acetates with low degree of substitution (DS, i.e., the number of substituents per anhydroglucose ring) have high affinity for water. C. J. Malm (British Patent 356,012 (1929)) discloses the preparation of cellulose monoacetate (CMA) by the sulfuric acid-catalyzed hydrolysis of cellulose triacetate (CTA) in aqueous sulfuric acid. The product, having a DS of 0.6–0.8 acetyls, was soluble in water. This necessitated isolation by addition of a nonsolvent. Other drawbacks of the Malm procedure include the long reaction times and the necessity for continuous or sequential addition of water to maintain reaction rates, resulting in a dilute reaction mixture and difficulties in recovery of by-product acetic acid. Neutralization of the catalyst at the end of the reaction affords sulfate salts, which can be difficult to separate from the polymer. Similar work by C. L. Crane (U.S. Pat. No. 2,327,770 (1943)) disclosed that cellulose diacetate could be hydrolyzed in aqueous acetone or aqueous alcohol using sulfuric acid catalyst to afford a water-soluble CMA. This process suffers shortcomings which are similar to those of the Malm process cited above.

In U.S. Pat. No. 2,005,383, T. F. Murray and C. J. Staud disclose the use of zinc iodide in ethanol to solvolyze CTA. This process afforded a product with DS about 1.75, required long reaction times, and consumed large amounts of zinc iodide (10 parts ZnI per part CTA). Even with this amount of zinc iodide, 40 hours reaction time was required to produce the product of DS 1.75.

In U.S. Pat, 2,836,590 (1958) H. W. Turner discloses high temperature (>180°C.) alcoholysis of cellulose acetate without the use of catalysts. At the temperatures disclosed by Turner, cleavage of the 1,4-glycosidic linkages of the cellulose ester backbone competes with the desired deacylation.

A different approach to CMA was taught by M. Diamantoglou, A. Brandner, and G. Meyer in U.S. Pat. No. 4,543,409 (1985). They acetylated cellulose in homogeneous solution (in N,N-dimethylacetamide (DMAC) containing lithium chloride). The product was a cellulose monoacetate by its DS, but was not soluble in water. There are serious concerns associated with the use of the toxic and expensive DMAC as a commercial reaction solvent.

There is, therefore, a need for a process to prepare cellulose acetates with low degree of substitution, and possessing high affinity for water. The process must use solvents which are inexpensive and easily recycled. It must employ catalysts which are either powerful enough to be used in small amounts or inexpensive enough to be used in large amounts when necessary. The process must allow for easy and economical product isolation and simple and economical recycle of solvents. It must require economically short reaction times, be reliable and repeatable, and use practical reaction temperatures.

STATEMENT OF THE INVENTION

In accordance with the present invention, cellulose esters of low degree of substitution (CELDS) are prepared in high yield by contacting cellulose esters of higher DS with a reactive solvent (water, alcohol or polyol) in the presence of a carboxylic acid solvolysis promoter, at a temperature sufficient to achieve the desired DS in the product. The desired product in many cases can be isolated simply by cooling the reaction mixture and filtering off the precipitated product.

More specifically, the present invention is directed to a process for reducing the degree of substitution of $C_1$–$C_{20}$ esters of cellulose, said process comprising contacting at least one of said esters of cellulose with:
(i) a solvent system comprising at least one solvent selected from the group consisting of water, an alcohol having up to 11 carbon atoms, and a polyol having up to 11 carbon atoms, and,
(ii) an effective amount of at least one solvolysis promoter selected from a carboxylic acid of the formula:

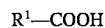

$R^1$—COOH wherein $R^1$ is hydrogen, a straight chain alkyl group having 1 to 7 carbon atoms, a branched chain alkyl group having 3 to 7 carbon atoms, or an aryl group having 6 to 10 carbon atoms, under conditions that promote formation of the desired product, i.e., a cellulose ester having a lower DS than that of the corresponding cellulose ester starting material.

The practice of the current invention allows for a wide variety of cellulose ester starting materials, solvolysis promoters, and reactive solvents. A wide variety of CELDS may be produced, including CMA's which have either good solubility in water or will absorb many times their weight in water.

DETAILED DESCRIPTION OF THE INVENTION

Figure 1:
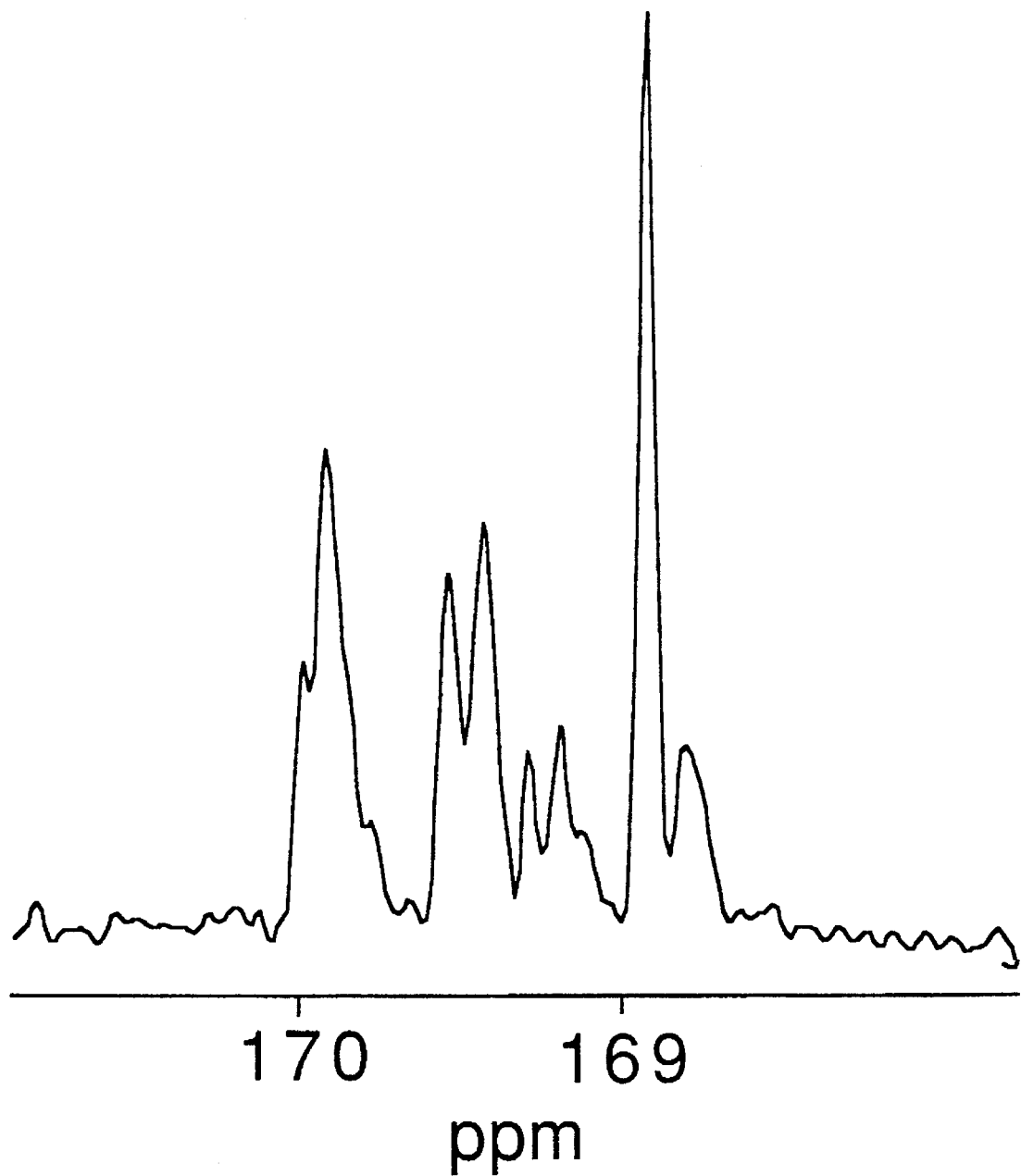
FIG. 1 the carbon-13 nuclear magnetic resonance (NMR) spectrum of the carbonyl carbon region for Example 1.

Cellulose esters suitable for use in the process of the present invention have the required DS (i.e., the DS of the starting cellulose ester is higher than the cellulose ester finished product) and comprise repeating units of the formula:

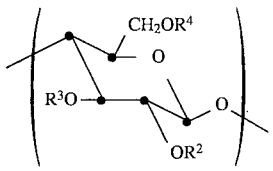

wherein each of $R^2$, $R^3$, and $R^4$ are independently selected from the group consisting of: hydrogen, straight chain alkanoyl, branched alkanoyl, aroyl and heteroaroyl. The alkanoyl, aroyl, and heteroaroyl groups typically have up to 20 carbon atoms, more typically up to 6 carbon atoms. Typical cellulose esters for use in the process of the present invention have between 2 (e.g., cellobiose) and about 5000 anhydroglucose repeating units. Starting esters typically have a DS falling in the range of about 2 to about 3; with preferred starting materials typically having a DS falling in the range of about 2.4 to about 3.0. Preferred esters of cellulose include cellulose acetate, cellulose butyrate, cellulose propionate, cellulose acetate butyrate, and cellulose acetate propionate.

As used herein the term "degree of substitution" or "DS" refers to the average number of acyl substituents per anhydroglucose ring of the cellulose polymer.

A wide variety of cellulose ester starting materials may be used for the process of the invention, which will generally correspond to the structure and limitations above. The only additional proviso is that the DS of the starting material will be greater than that of the product. Product cellulose esters produced by the process of the present invention typically have a DS in the range of about 0.4 to about 1.2; preferred is a DS in the range of about 0.5 to about 1.0. The inherent viscosity (I.V.) of the product cellulose ester is typically in the range of about 0.05 to about 1.5 deciliters per gram (preferably about 0.05 to about 1.0), as measured at a temperature of 25° C. for a 0.25 gram sample in 100 ml of dimethylsulfoxide (DMSO). Generally, the I.V. of the cellulose ester starting material is slightly higher than the I.V. of the product cellulose ester. A typical I.V. range of the cellulose ester starting material is about 1.5 to about 3.0. The most preferred cellulose esters for use in the present invention (as both starting material and finished product) include cellulose acetate, cellulose propionate, cellulose butyrate, cellulose acetate propionate, and cellulose acetate butyrate.

Solvent systems contemplated for use in the practice of the present invention are reactive solvents and comprise at least one solvent selected from the group consisting of water, an alcohol having up to 11 carbon atoms and a polyol having up to 11 carbon atoms.

Polyols may contain two or more hydroxyl groups.

The solvent is preferably water, an n-alkanol having 1 to 7 carbon atoms, a branched alkanol having 3 to 7 carbon atoms, or an aryl alkanol having 7 to 11 carbon atoms. More preferred n-alkanols have 1 to 4 carbon atoms, and more preferred branched alkanols have 3 to 4 carbon atoms.

Exemplary solvents contemplated for use in the practice of the present invention include water, methanol, ethanol, n-propanol, n-butanol, isopropyl alcohol, benzyl alcohol and ethylene glycol. Presently, the more preferred solvents include water, methanol, ethanol, ethylene glycol and n-propanol. Methanol, water, and mixtures thereof are presently the most preferred solvents for use in the practice of the present invention because of their ready availability, relatively low cost, and ease of handling.

The solvolysis promoters useful in the present invention are carboxylic acids of the formula

wherein $R^1$ is hydrogen, a straight chain alkyl group having 1 to 7 carbon atoms, a branched chain alkyl group having 3 to 7 carbon atoms or an aryl group having 6 to 10 carbon atoms. Preferred $R^1$ moieties are straight chain alkyl groups having 1 to 6 carbon atoms and branched chain alkyl groups having 3 to 6 carbon atoms. The most preferred $R^1$ moieties are H, methyl, ethyl, and n-propyl. Examples of typical carboxylic acid solvolysis promoters include acetic acid, formic acid, propionic acid, and butyric acid. Presently preferred carboxylic acids include butyric acid, propionic acid, and acetic acid.

The quantity of solvolysis promoter employed in the practice of the present invention can vary widely. Preferred quantities fall in the range of about 10 up to 10,000 mole percent, based on the moles of anhydro-glucose repeat units of the cellulose ester, with quantities in the range of about 1000 up to 3000 mole percent, based on the moles of anhydroglucose repeat units of the cellulose ester, being presently most preferred.

The concentration of cellulose ester in the solvent system can vary widely. Preferred concentrations fall in the range of about 0.33 up to 40 percent, calculated as the weight of ester per volume of the solvent system plus solvolysis promoter; with concentrations in the range of about 10 up to 25 percent, calculated as the weight of ester per volume of solvent system being presently most preferred.

Reaction conditions contemplated for use in the practice of the present invention can vary widely. The temperature for the process of the invention should be high enough to maintain the desired reaction rate. For example, reaction temperature can vary in the range of about 75° C. up to about 200°C., with temperatures in the range of about 130° C. up to about 180° C. being preferred. The presently most preferred temperature range for the practice of the present invention falls in the range of about 140° C. to 160°C.

Those of skill in the art readily recognize that contact times and reaction temperatures employed are interdependent, and thus can vary considerably. While the contact time may extend up to 48 hours at low reaction temperatures, when the reaction temperature is within the preferred range, the contact time will fall within the range of 1 to 24 hours. The presently most preferred contact time range is 10 to 18 hours.

The rate of heating of the reaction mixture to the desired reaction temperature is not so rapid as to cause a significant degree of charring of the starting ester of cellulose, and the reaction pressure is sufficient to maintain the components of said solvent system substantially in the liquid state at the desired reaction temperature.

The invention will be described in greater detail by reference to the following non-limiting examples.

All percentages are by weight unless indicated otherwise.

EXAMPLES

In the following examples, except where noted, the materials used were loaded into a 1-liter, steel Parr reactor equipped with a magnetically coupled agitator. The reactor was sealed, then heated to the contact temperature. The heat-up time was typically 1 to 2 hours. The initial pressure in the reactor was typically 200–500 psi nitrogen. The reaction mixture was stirred at the indicated temperature for the indicated reaction time. Then the reaction mixture was allowed to cool to room temperature, which typically took 2 to 3 hours. The products were isolated by filtration of the resulting slurry. The solvent and solvolysis promoter, as well as any cosolvents, typically could be recovered from the filtrate by distillation. The results in the examples indicate yields of isolated, well-characterized products. The products typically were characterized by titration, proton NMR spectroscopy, gas chromatography, gel permeation chromatography (N,N-dimethylformamide/0.5% LiBr solvent, polystyrene reference standard), inherent viscosity, and other methods familiar to one well versed in the art.

Proton NMR data were obtained on either a JEOL Model GX-400 NMR spectrometer or a JEOL Model GX-270 NMR spectrometer operating at 400 MHz and 270 MHz, respectively. The sample tube size was 5 mm and the sample concentrations were 30 mg per ml of DMSO-$d_6$. One to two drops of trifluoroacetic acid (TFA) were added to the sample to shift residual water from the spectral region of interest. All proton NMR spectra were recorded at 80°C.

Carbon 13 NMR data were obtained on a JEOL Model GX-270 NMR spectrometer operating at 67.9 MHz. The sample concentration was 100 mg/ml (±0.01 mg) of DMSO-$d_6$. Three to fifty mg of Cr(AcAc)$_3$ was added to each sample as a relaxation agent. The sample tube size was 10 mm. Each carbon 13 NMR spectrum was acquired at 80° C., the pulse delay was 10 sec, and 12,000 to 16,000 scans were used to acquire each spectrum. Each spectrum was collected with 32768 points and was zero filled to 65536 points to give a resolution of 0.52 Hz. Carbon 13 chemical shifts are reported in ppm from tetramethylsilane with the center peak of DMSO-$d_6$ (39.5 ppm) as an internal reference. All NMR spectra were processed by using a 8 Mb Mac II Macintosh Computer, with VersaTerm Pro as an emulation package and MacDraw II as a graphics package, interacting with Hare's FTNMR software (obtained from Hare Research, Inc., 14810 216th Ave., N.E., Woodinville, Wash. 98072) running on a VAX 8800 computer.

GPC data was acquired using a Waters Model 150C High Temperature Gel Permeation Chromatograph operating at 60°C. The mobile phase was DMF containing 0.5% LiBr. Sample size was 20–25 mg/10 ml and the injection size was 100 μl. Molecular weights are reported in polystyrene equivalents.

Inherent Viscosity was measured using a Schott Gerate AVS24 instrument operating at 25°C. Sample concentration was 0.25 g per 100 ml of DMSO.

EXAMPLE 1

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Triacetate (DS 2.98) |
|---|---|
| Weight (g) | 82.5 |
| Solvolysis Promoter | Acetic Acid |
| Weight (g) | 351 |
| Reactive Solvent | Methanol |
| Weight (g) | 211 |
| Temperature (°C.) | 150 |
| Contact Time (h) | 12 |
| Product | Cellulose Monoacetate |
| Key Analyses | DS 0.72, IV (DMSO) 0.53, Soluble in water |
| Yield (%) | 89.4 |

This example differs from the standard procedure in the following way: of the 211 g of methanol used, 92 g was initially charged to the reactor along with the cellulose triacetate and acetic acid. The reaction mixture was heated to 150° C. and held for 3 hours at 150°C. Then the remainder of the methanol (119 g) was added by pump over a one hour period. The reaction mixture was held 8 hours at 150°C., then was cooled and the product isolated as in the standard procedure. The total reaction time was 12 hours, as indicated above.

This example demonstrates that acetic acid is an effective solvolysis promoter for the solvolysis of cellulose esters. It also demonstrates that the solvolysis promoter is effective for production of water-soluble cellulose acetate in high yield.

FIG. 1 shows the $^{13}$C spectrum of the carbonyl carbon region of the product ester. Comparison of FIG. 1 to FIG. 2 (prepared by the method of Malm, British Patent 356,012 (1929)) demonstrates that the process of the present invention provides CMA's with an acetyl distribution similar to the process taught by Malm.

EXAMPLE 2

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Tripropionate |
|---|---|
| Weight (g) | 66.7 |
| Solvolysis Promoter | Propionic Acid |
| Weight (g) | 317 |
| Reactive Solvent | Methanol |
| Weight (g) | 64.2 |
| Temperature (°C.) | 155 |
| Contact Time (h) | 8 |
| Product | Cellulose Monopropionate |
| Key Analyses | DS 1.06, IV (Phenol/$C_2Cl_4$) 1.07, GPC Mw 321,000, Mn 223,000 |
| Yield (%) | 79.2 |

This example differs from the standard procedure in the following way: the product was isolated in this case by addition of the reaction mixture to water, followed by filtration.

This example demonstrates the efficacy of the method using propionic acid as solvolysis promoter, and cellulose tripropionate as substrate.

EXAMPLE 3

Reagents set forth below were charged to a one liter glass reactor, equipped with a magnetically coupled agitator and thermocouple, and heated with oil circulated through a jacket. The mixture was heated to the contact temperature over 48 minutes, held at the contact temperature for the contact time indicated, and cooled to room temperature. The product was isolated by filtration of the reaction mixture.

The results, in terms of identity and yield of the desired cellulose ester, and key analyses of the product, are also set forth below.

| Starting Cellulose Ester | Cellulose Triacetate (DS 2.98) |
|---|---|
| Weight (g) | 82.5 |
| Solvolysis Promoter | Acetic Acid |
| Weight (g) | 346 |
| Reactive Solvent | Ethanol |
| Weight (g) | 251 |
| Temperature (°C.) | 150 |
| Contact Time (h) | 20 |
| Product | Cellulose Monoacetate |
| Key Analyses | DS 0.46, IV (DMSO) 0.351, Soluble in water |
| Yield (%) | 40.0 |

This example demonstrates that ethanol is an effective reactive solvent for the solvolysis of cellulose esters. It further demonstrates that water-soluble esters may be produced using ethanol as reactive solvent.

EXAMPLE 4

Reagents set forth below were charged to a one liter glass reactor, equipped with a magnetically coupled agitator and thermocouple, and heated with oil circulated through a jacket. The mixture was heated to the contact temperature over 52 minutes, held at the contact temperature for the contact time indicated, and cooled to room temperature. The product was isolated by filtration of the reaction mixture. The results, in terms of identity and yield of the desired cellulose ester, and key analyses of the product, are also set forth below.

| Starting Cellulose Ester | Cellulose Triacetate (DS 2.98) |
|---|---|
| Weight (g) | 82.5 |
| Solvolysis Promoter | Acetic Acid |
| Weight (g) | 315 |
| Reactive Solvent | Methanol |
| Weight (g) | 175 |
| Reactive Solvent | Water |
| Weight (g) | 36 |
| Temperature (°C.) | 150 |
| Contact Time (h) | 16 |
| Product | Cellulose Monoacetate |
| Key Analyses | DS 0.67, IV (DMSO) 0.42, Soluble in water |
| Yield (%) | 83.3 |

This example differs from the standard procedure in the following additional way: of the two reactive solvents listed above, 120 g methanol was included in the initial charge to the reactor. The remainder of the methanol and all of the water were mixed and pumped into the reactor over one hour, starting after 4 hours of the contact time had elapsed.

This example demonstrates that mixtures of water and methanol are effective reactive solvents for the solvolysis of cellulose esters. It further demonstrates that these mixed reactive solvents may be used to produce water-soluble esters.

EXAMPLE 5

Reagents set forth below were charged to a one liter glass reactor, equipped with a magnetically coupled agitator and thermocouple, and heated with oil circulated through a jacket. The mixture was heated to the contact temperature over 57 minutes, held at the contact temperature for the contact time indicated, and cooled to room temperature. The results, in terms of identity and yield of the desired cellulose ester, and key analyses of the product, are also set forth below.

| Starting Cellulose Ester | Cellulose Triacetate (DS 2.98) |
|---|---|
| Weight (g) | 66.7 |
| Solvolysis Promoter | Acetic Acid |
| Weight (g) | 437 |
| Reactive Solvent | Methanol |
| Weight (g) | 93 |
| Temperature (°C.) | 141 |
| Contact Time (h) | 6 |
| Product | Cellulose Diacetate |
| Key Analyses | DS 1.91, IV (DMSO) 1.02, GPC Mw 298,000, Mn 153,000, Mz 503,000. Absorbs about 12 times its weight in water. |
| Yield (%) | 89.2 |

This example differs from the standard procedure in that the product was isolated from the homogeneous reaction mixture by adding the solution to 1 liter methanol, then filtering to collect the solid product.

This example demonstrates that the method of the invention may be used to prepare cellulose esters which absorb many times their weight in water.

EXAMPLE 6

The reagents set forth below were subjected to the standard procedure described above, modified as indicated below, under the indicated reaction conditions. The results, in terms of identity and yield of the desired cellulose ester, and key analyses of the product, are also set forth below.

| Starting Cellulose Ester | Cellulose Triacetate |
|---|---|
| Weight (parts) | 125 |
| Catalyst | Sulfuric Acid |
| Solvent | Acetic Acid |
| Weight (parts) | 728 |
| Reactive Solvent | Water |
| Weight (parts) | 479 |
| Temperature (°C.) | 82 |
| Contact Time (h) | 70 |
| Product | Cellulose Monoacetate |
| Key Analyses | DS 0.77, IV (DMSO) 1.21, GPC Mw 759,000, Mn 378,000 |

This example differs from the standard procedure in the following way: the reaction was run in a mechanically stirred steel reactor. The product was isolated by pouring the reaction mixture into isopropyl alcohol, followed by filtration.

This example demonstrates the long reaction times and high dilution of the conventional process, as well as the characteristics of the product made by the conventional process.

Figure 2:
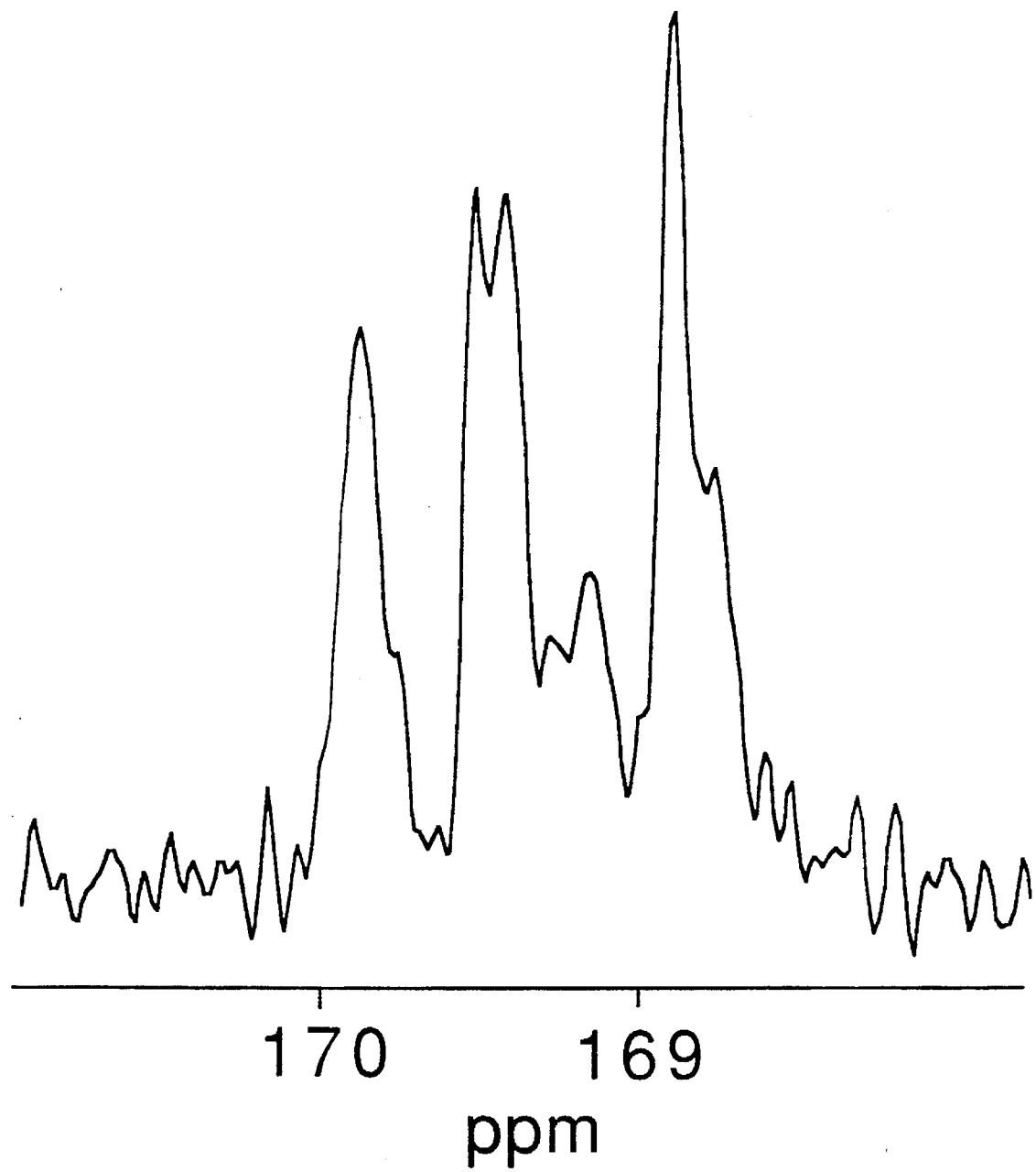
FIG. 2 is the carbon-13 nuclear magnetic resonance (NMR) spectrum of the carbonyl carbon region for Example 6.

$^{13}C$ NMR spectrum of the product acetyl region: see FIG. 2.

The invention has been described in detail with particular reference to preferred embodiments thereof, but it will be understood that variations and modifications can be effected within the spirit and scope of the invention.

We claim:

1. A process for reducing the degree of substitution of $C_1$–$C_{20}$ esters of cellulose without mineral acid catalysis, said process comprising contacting at least one of said esters of cellulose with:
   (i) a solvent system comprising at least one solvent selected from the group consisting of an alcohol having from about 1 to 11 carbon atoms, and a polyol having from 2 to 11 carbon atoms, or a mixture of water with said polyol or said alcohol or with said polyol and said alcohol, and (ii) at least one solvolysis promoter selected from a carboxylic acid of the formula:

$$R^1\text{—COOH}$$

wherein $R^1$ is hydrogen, a straight chain alkyl group having 1 to 7 carbon atoms, a branched chain alkyl group having 3 to 7 carbon atoms, or an aryl group having 7 to 11 carbon atoms, wherein said solvolysis promoter is present in an amount of from 10 to 10,000 mol %, based on the moles of anhydroglucose repeat units of the cellulose ester, wherein said product ester of cellulose has a lower degree of substitution than the corresponding ester of cellulose starting material, wherein said contacting is carried out for a reaction time of about 10 to about 18 hours at a temperature of about 130° C. to 180°C., and wherein the product cellulose ester is water absorbent or water soluble, and has a degree of substitution falling in the range of 0.4 up to 1.2.

2. A process in accordance with claim 1 wherein the starting ester of cellulose has a degree of substitution about 2 up to 3.

3. A process in accordance with claim 1 wherein the starting ester of cellulose has a degree of substitution about 2.4 up to 3.0.

4. A process in accordance with claim 1 wherein $R^1$ is a straight chain alkyl group having 1 to 6 carbon atoms or a branched chain alkyl group having 3 to 6 carbon atoms.

5. A process in accordance with claim 1 wherein said solvolysis promoter is acetic acid, propionic acid or butyric acid.

6. A process in accordance with claim 1 wherein said solvolysis promoter is acetic acid.

7. A process in accordance with claim 1 wherein said solvent system comprises at least one solvent selected from the group consisting of, an n-alkanol having 1 to 7 carbon atoms, a branched alkanol having 3 to 7 carbon atoms, an aryl alkanol having 7 to 11 carbon atoms, or a mixture of at least one of said alkanols with water.

8. A process in accordance with claim 1 wherein said solvent system comprises at least one solvent selected from the group consisting of methanol, ethanol, n-propanol, n-butanol, isopropyl alcohol, benzyl alcohol, and ethylene glycol, or a mixture of at least one of said alcohols with water.

9. A process in accordance with claim 1 wherein said solvent system comprises methanol.

10. A process in accordance with claim 1 wherein the product cellulose ester has an inherent viscosity, measured at a temperature of 25° C. for a 0.25 gram sample in 100 mL of DMSO, in the range of about 0.05 up to 1.0 deciliters/gram.

11. A process in accordance with claim 1 wherein the amount of solvolysis promoter is from about 1,000 up to 3,000 mol %, based on the moles of anhydroglucose repeat units of the cellulose ester.

12. A process in accordance with claim 1 wherein the concentration of cellulose ester in said solvent system falls in the range of about 0.33 up to 40%, calculated as the weight of ester per volume of solvent system.

13. A process in accordance with claim 1 wherein the concentration of cellulose ester in said solvent system falls in the range of about 10 up to 25%, calculated as the weight of ester per volume of solvent system.

14. A process in accordance with claim 1 wherein said reaction temperature is is from about 140° C. to about 160°C.

15. A process in accordance with claim 1 wherein the starting ester of cellulose is cellulose acetate, cellulose butyrate, cellulose propionate, cellulose acetate butyrate, or cellulose acetate propionate.

* * * * *